United States Patent
Van Horne, III

(10) Patent No.: US 8,166,141 B1
(45) Date of Patent: Apr. 24, 2012

(54) METHOD AND APPARATUS FOR EMULATING WEB BROWSER PROXIES

(75) Inventor: Edwin James Van Horne, III, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 2967 days.

(21) Appl. No.: 09/906,632

(22) Filed: Jul. 16, 2001

(51) Int. Cl.
 *G06F 15/173* (2006.01)
(52) U.S. Cl. .......................... 709/223; 709/218; 709/225
(58) Field of Classification Search .................. 709/225, 709/223, 218
 See application file for complete search history.

(56) References Cited

U.S. PATENT DOCUMENTS

| | | | |
|---|---|---|---|
| 5,935,212 A | 8/1999 | Kalajan et al. | 709/228 |
| 5,991,810 A | 11/1999 | Shapiro et al. | 709/229 |
| 6,130,892 A | 10/2000 | Short et al. | 370/401 |
| 6,138,162 A | 10/2000 | Pistriotto et al. | 709/229 |
| 6,173,311 B1 * | 1/2001 | Hassett et al. | 709/202 |
| 6,182,141 B1 | 1/2001 | Blum et al. | 709/227 |
| 6,185,616 B1 | 2/2001 | Namma et al. | 709/227 |
| 6,212,560 B1 * | 4/2001 | Fairchild | 709/223 |
| 6,212,565 B1 | 4/2001 | Gupta | 709/229 |
| 6,442,601 B1 * | 8/2002 | Gampper et al. | 709/218 |
| 6,567,857 B1 * | 5/2003 | Gupta et al. | 709/238 |
| 6,728,885 B1 * | 4/2004 | Taylor et al. | 713/201 |
| 6,792,461 B1 * | 9/2004 | Hericourt | 709/225 |

\* cited by examiner

*Primary Examiner* — Kyung H Shin

(74) *Attorney, Agent, or Firm* — BainwoodHuang

(57) ABSTRACT

A user device disposed on a local area network (LAN) requests a proxy auto-configuration file from a first proxy server. Where the first proxy server is not present on the LAN, a second proxy server on the LAN intercepts the request and responds to it by causing a replacement proxy auto-configuration file to be sent to the user device. The user device utilizes the replacement proxy auto-configuration file to configure itself to utilize the second proxy server on the LAN.

12 Claims, 3 Drawing Sheets

METHOD AND APPARATUS FOR EMULATING WEB BROWSER PROXIES

FIELD OF THE INVENTION

The present invention relates to electronic data communications. More particularly, the present invention relates to a method and apparatus for emulating a proxy auto-configuration file for use by a client computer to access a proxy server.

BACKGROUND OF THE INVENTION

A proxy server, also referred to simply as a proxy, is an application or device that provides access to other external networks (collectively referred to herein as the "Internet") while appearing to the Internet as a single computer system. For example, current proxy technologies allow multiple personal computers (PCs) connected to a local area network (LAN) to access the Internet through an Internet Service Provider (ISP) via the proxy server. Only the proxy server is visible to the Internet, i.e., TCP/IP packets entering the Internet from the proxy server all appear to have a single IP source address and all communications from the Internet to the LAN are addressed to a single IP destination address regardless of the location on the LAN to which they are directed.

FIG. 1 illustrates a schematic diagram of a client computer 102 accessing the Internet 104 through a proxy server 106 according to the prior art. The client computer 102, running an application program such as a web browser, may communicate with a configuration server 108 that provides proxy settings in the home LAN environment. Alternatively, the settings may be made manually by configuring the web browser on the client computer 102. When a local configuration server approach is used, the proxy settings are stored in a file referred to as a proxy auto-configuration file which is typically stored on the configuration server 108. The client computer 102 then uses the retrieved proxy settings to locate and access the proxy server 106. The proxy server 106 receives requests from the client computer 102 on a Local Area Network (LAN) to communicate with the Internet 104 external to the LAN. The proxy server 106 evaluates these requests and determines which of the communication requests to pass on to the web server 104 or Internet 110 where the remote server(s) are located. If a communication request is approved, the proxy server 106 communicates with the Internet 104 on behalf of the client computer 102. The proxy server 106 does so by relaying requests from the client computer 102 to the Internet 104 and returning responses back to the client computer 102. In this manner, the proxy server 106 provides the illusion that the client computer 102 is communicating directly with the Internet 104. The proxy server 106 therefore acts as a barrier between the client computer 102 and the Internet 104 by presenting only a single network address to external sites. By acting as a buffer, the proxy server 106 thus provides some measure of security to the computers on the LAN by protecting their specific network identities while still providing access to the Internet 104.

Conventional proxy servers require each client computer's application program, such as an Internet browser program, to be configured to recognize and use a local proxy server. Specifically, client programs need to know how to contact the local proxy server with a communication request, and how to format the communication request in order to correctly identify the remote server with which communication is requested. Client computer's application programs that do not include proxy configuration capabilities may not make use of such proxy servers.

Another class of proxy servers, transparent proxy servers, can provide proxy services to client computers not configured to use a proxy. Such servers intercept packets from the client and provide proxy services unbeknownst to the client, hence the term "transparent" proxy server. Transparent proxy servers do not address the class of clients supported by this invention because these clients are attempting to communicate with a configuration server to obtain proxy settings. A transparent proxy server would not satisfy the request for configuration settings and thus would fail to support this class of clients.

However, a client computer's web browser configured to access a specific proxy server on a home network may be unable to access the Internet when that client computer is connected to another network different from its home network. For example, a laptop computer, also known as a mobile computer, having its web browser configured to access a specific proxy while connected to a home network may not be able to access the Internet when it is plugged into a foreign network, such as at a hotel or at the office. Unless the user manually reconfigures the web browser to use a locally accessible proxy, the web browser may fail to communicate beyond the LAN.

The prior art allows mobile computers to send packets through routers without Internet Protocol (IP) address reconfiguration of the computer because the computer can be configured to always obtain an appropriate IP address at start-up from a Dynamic Host Configuration Protocol (DHCP) server associated with the LAN to which the mobile computer is connected. Furthermore, Network Address Translation (NAT) allows a LAN to have a large number of IP addresses which are exclusively assigned to the computers on the LAN and which are not visible beyond the LAN. However, neither DHCP nor NAT address the problems of web browser configurations that conflict with a local network configuration. The prior art allows a mobile computer to connect to any network, but its web browser may remain inoperative for some or all web proxy configuration unless correctly reconfigured by an adept user.

Accordingly, there is a need for a mechanism for configuring a computer to interact with a proxy server on any network to which a computer may find itself connected.

BRIEF DESCRIPTION OF THE INVENTION

A user device disposed on a local area network (LAN) requests a proxy auto-configuration file from a first proxy server. Where the first proxy server is not present on the LAN, a second proxy server on the LAN intercepts the request and responds to it by causing a replacement proxy auto-configuration file to be sent to the user device. The user device utilizes the replacement proxy auto-configuration file to configure itself to utilize the second proxy server on the LAN.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a method and apparatus for emulating a proxy server. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 2:
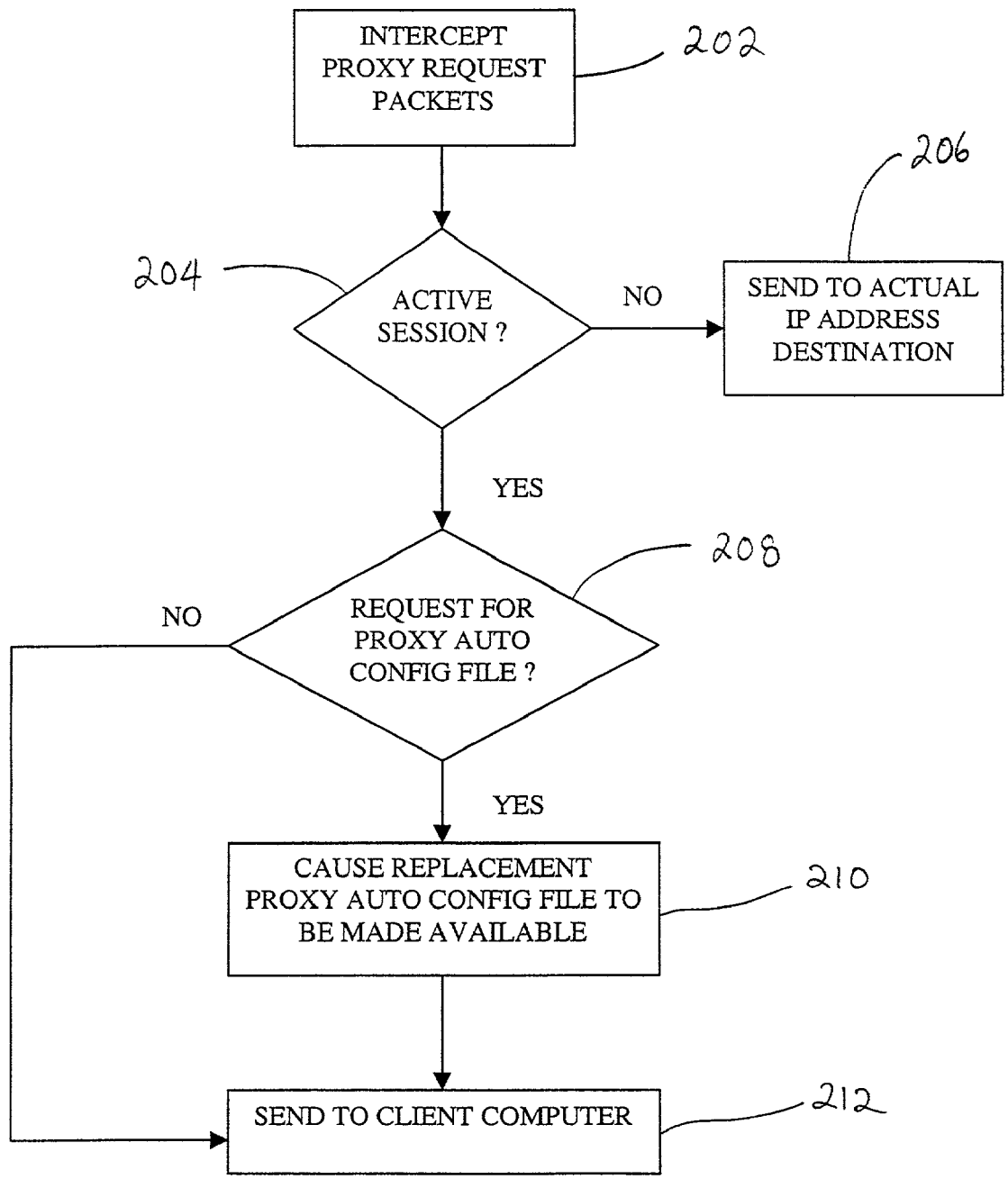
FIG. 2 is a flow diagram illustrating a method for emulating a proxy server on a foreign network with a client computer configured to access another proxy server on a home network.
Figure 3:
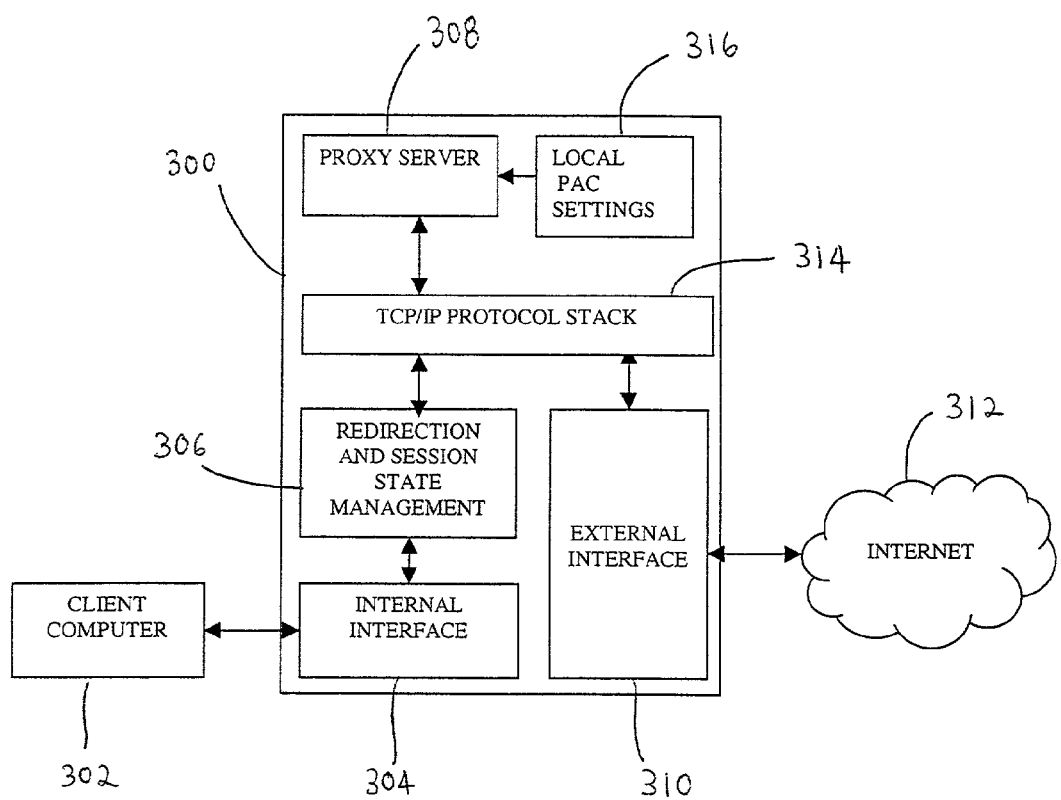
FIG. 3 is a schematic diagram illustrating an apparatus for emulating a proxy server on a foreign network with a client computer configured to access another proxy server on a home network.
Figure 1:
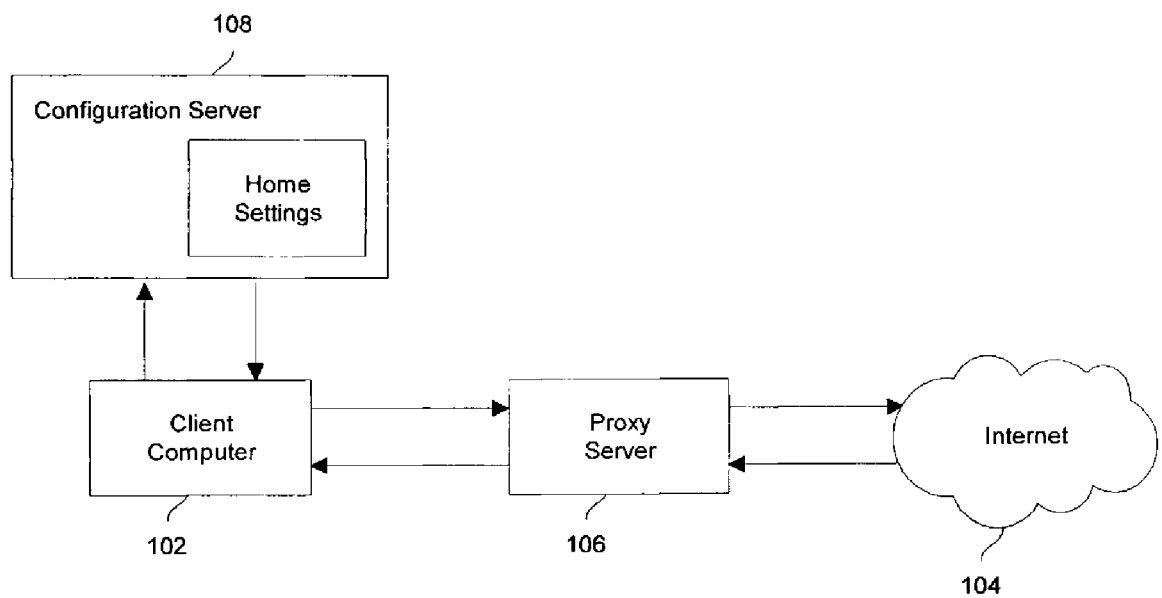
Figure 2:
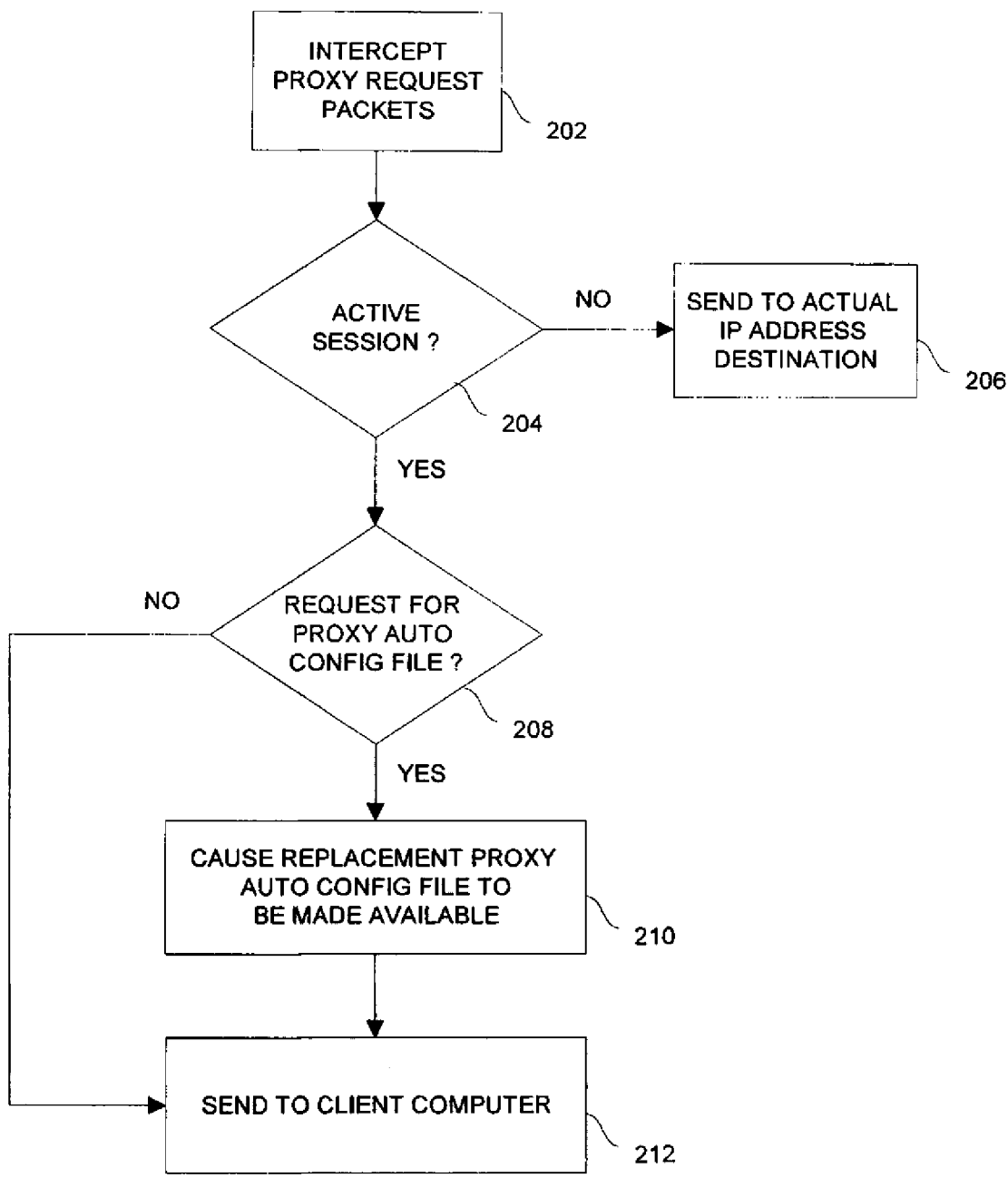
Figure 3:
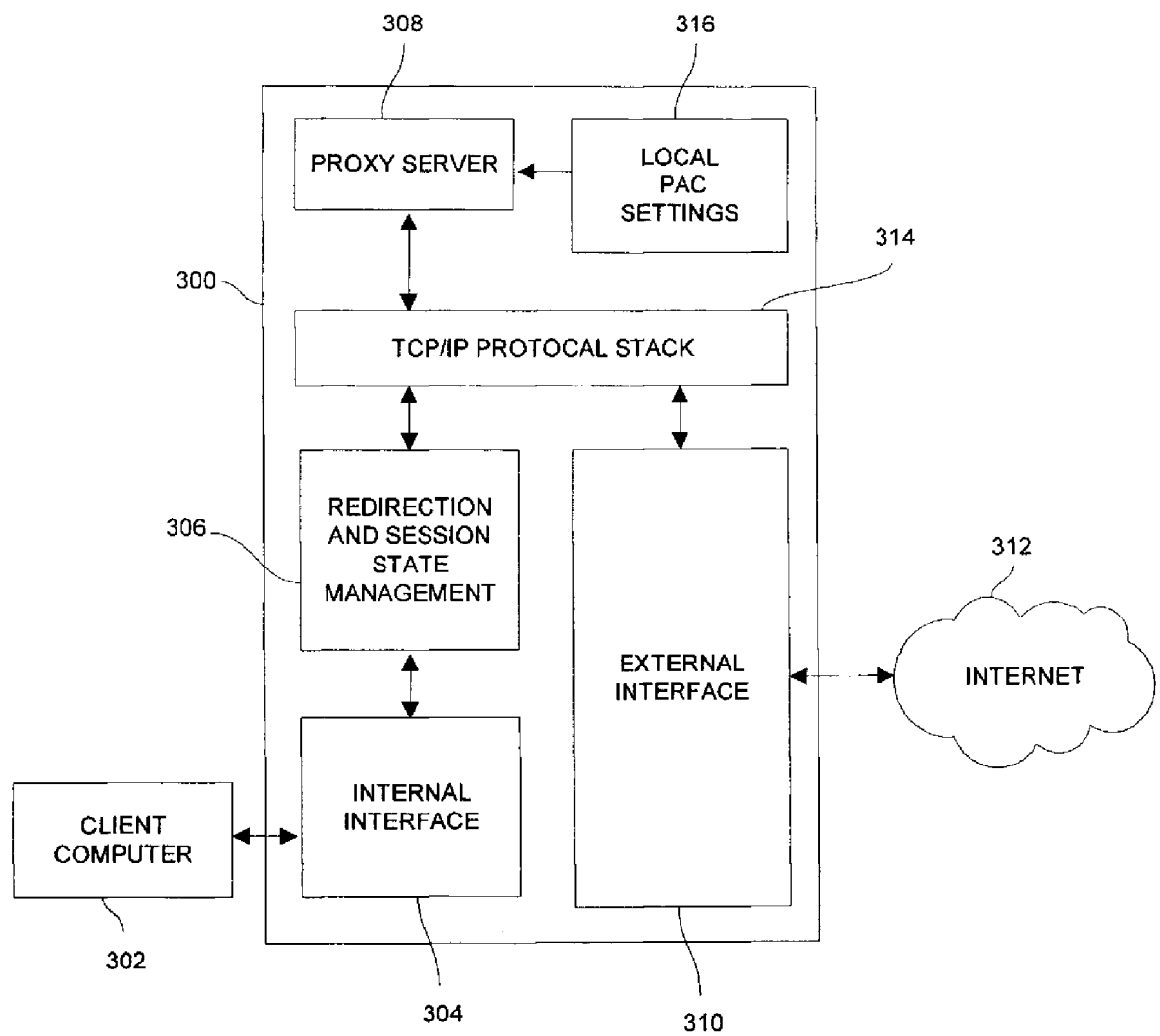

FIG. 2 illustrates a flow diagram of a method for emulating a proxy server on a foreign network with a client computer configured to access another proxy server on a home network. FIG. 3 illustrates a schematic diagram of an apparatus 300 for emulating a proxy server on a foreign network with a client computer configured to access another proxy server on a home network.

A user device, such as a client computer 302 or any other computing device, may originally be configured to access a specific proxy server (not shown) on a home network (not shown). Most Internet browsers provide a feature that reads the proxy settings from a URL specified in the browser's proxy settings. MIS department and Internet Service Providers can take advantage of this feature to administer the proxy settings for client browsers in a central location—i.e. a proxy auto configuration file. As illustrated in FIG. 3, while away from the home network, the client computer 302 may be connected to the apparatus 300. The apparatus 300 may be, for example, a server or a router and may further comprise an internal interface 304, a redirection and session state management driver 306, a proxy server 308 or web server, and an external interface 310. The apparatus 300 also acts as a barrier and a buffer between the client computer 302 and the Internet 312. A client application program, such as a web browser, hosted on the client computer 302 allows a user to specify a Universal Resource Locator (URL) address in the web browser. Generally, the web browser uses an HTTP protocol to access the apparatus 300. However, the web browser may also be configured to request proxies with other protocols, such as FTP.

When a request is made by the client computer 302, packets containing proxy requests sent by the client computer 302 are intercepted by the apparatus 300 in a first block 202 of FIG. 2. More specifically, the internal interface 304 receives packets from the client computer 302. The internal interface may comprise a hardware component having a software driver that interfaces between the server 300 and the network to which the client computer 302 is attached. Traffic through the internal interface 304 passes either from the client computer 302 to the redirection and session state management 306 or from the redirection and session state management 306 to the client computer 302.

The redirection and session state management driver 306 monitors the state of the session for each client computer 302. An authorization component (not shown) sets the state of each client computer session to either "authorized" or "unauthorized" in a conventional manner. All IP traffic from unauthorized clients, regardless of the destination IP address set by the client computer 302 is sent to the proxy server 308 via a TCP/IP protocol stack 314. The redirection component of the driver 306 redirects the packets by recording the destination IP address and setting that address to the IP address of the proxy server 308. The source IP address of replies to the client computer 302 are rewritten to be the destination IP address requested by the computer client 302 originally to make it appear to the client computer 302 that it is communicating with its intended destination. While the redirection and session state management driver 306 redirects traffic, it also scans packets for a request for a proxy auto-configuration file by monitoring a request for a list of well known suffixes. If the URL request has such a suffix, the redirection component of the driver 306 simulates a "302" (Redirect) response from the proxy server 308 to cause the client computer 302 to request the local ".pac" settings file instead of the one originally configured in the client computer 302. An alternative embodiment of this invention could simply return the local settings in response to the request without the step involving the "302" (Redirect). However, this process does not alter the settings on the client computer 302. When the client computer 302 returns to its home network, it will retrieve its home proxy auto configuration file and successfully operate on the home network.

Once informed by a conventional authentication server (not shown) that the client computer 302 is authorized, the redirection and session state management driver 306 stops rewriting the destination IP address, allowing the traffic to other addresses to flow through the TCP/IP protocol stack 314 to the external interface 310 and out to the Internet 312. The redirection and session state management component 306 may be implemented as an NDIS intermediate driver between the TCP/IP protocol stack 314 and the internal interface 304 under the Microsoft Windows operating system. The scope of this invention is not limited to Windows. An implementation under Sun Microsystems' Solaris operating system, for example, could use Streams drivers.

The TCP/IP protocol stack 314 passes packets between the interfaces and applications on the proxy server 308. The protocol stack 314 performs routing, error detection and retransmission, and flow control for network traffic.

The proxy server 308 may comprise a software component (not shown) that detects for HTTP TCP port (80) requests for web content from the client computer 302. Such proxy server 308 may act as proxies for clients to request web content from another web server (not shown). The proxy server 308 responds to the redirected request for the local ".pac" settings 316.

The ".pac" settings file contains a script for a function, "FindProxyFromUrl", that accepts a URL and returns a strings specifying the proxy to use to access that URL. A different proxy might be used, depending the URL. The web browser on the client computer 302 reads this file, which the apparatus 300 uses to replace the one actually configured on the client computer 302.

In a block 204, the redirection and session state management driver 306 identifies the client computer 302 using commonly known methods, for example, via a source IP or MAC address. The redirection and session state management driver 306 also maintains a record of the authorization status for every client computer connected to the apparatus 300. Initially, the client computer 302 is deemed "inactive" since it has not been yet authenticated. The redirection and session state management driver 306 redirects, via HTTP protocol or any other suitable protocol, any attempt to access a web page on the Internet 312 before the apparatus 300 has authorized Internet access for the client computer 302. For example, an active server page may call an object that returns the URL of an appropriate authentication page. The user may see an authentication page in place for his or her home page. The apparatus 300 may also support several different types of authentication pages.

In block 206, once the client computer 302 is authenticated, the packets are sent to their respective actual IP address destination. More specifically, when a user authenticates successfully, the apparatus 300 may authorize the client computer 302 to access to the Internet 312 and redirect him or her to a primary portal that can be customized through the apparatus 300 on a global or per port basis.

Until the client computer 302 is authenticated, the redirection and session state management driver 306 directs all traffic it receives from the client computer 302 through a TCP/IP protocol stack 314 to communicate with the proxy server 308. In a block 208, the proxy server 308 detects a proxy auto configuration file request, for example, an HTTP GET request for a URL with specific suffixes such as ".pac". In a block 210, when a request for a proxy auto configuration file is detected, the request is modified to retrieve a replacement proxy auto configuration file with locally accessible settings 316. If no request for a proxy auto configuration file is detected, the packets are directly sent to remote servers (not shown) or the Internet 312 through the external interface 310.

One example of causing the replacement proxy auto configuration file to be made available to the client computer 302 is to redirect the request for the original proxy auto configuration file to the replacement auto configuration file 316 locally located in proxy server 308.

Another example causing the replacement proxy auto configuration file to be made available to the client computer 302 includes rewriting the packets for the request for the original proxy auto configuration file to retrieve the replacement proxy auto configuration file locally located in proxy server 308. In a block 212, the rewritten request is then passed on through the TCP/IP protocol stack 314 to an external interface 310, such as an Ethernet interface, that communicates with other remote servers, or the Internet 312.

The external interface 310 hardware component and its associated software driver (not shown) interfaces between the server 300 and the Internet 312. Traffic through the external interface 310 passes either from the Internet 312 to the TCP/IP Protocol Stack 314 (which determines the destination of the packet) or from the TCP/IP Protocol Stack 314 to the Internet 312 (when the protocol stack determines that the destination is on the Internet 312).

The proxy server 308 serves the replacement proxy auto configuration settings appropriate for the local environment back to the client computer 302. After the web browser in the client computer 302 has applied the configuration from the replacement proxy auto configuration file, the client computer 302 can then access web pages providing authentication. That is, authenticated clients have "active sessions" and are allowed to send packets where they wish instead of having them redirected to the local system. Unauthorized clients are redirected to an appropriate authentication page located on proxy server 308.

The following is an example illustrating the operation of the apparatus 300. A client computer 302 may be configured to access proxy settings from http://www.cisco.com/ciscoproxy.pac. The customer's DNS server may be, for example, 204.71.200.75 while the Proxy Server address may be, for example, 207.46.238.57. Initially, the client computer 302 requests the IP address for the DNS host 'www.cisco.com' from 204.71.200.75. The redirection component of driver 306 records '204.71.200.75' and sets the destination IP to 207.46.238.57, which is the Proxy Server address. The redirection component of driver 306 also adjusts the packet checksums. The TCP/IP Protocol Stack 314 delivers the packets to the Proxy Server 308. The Proxy Server 308 then forwards DNS requests to the Internet 312 through the External Interface 310. The authority for "www.cisco.com" returns the address '198.133.219.25' to the Proxy Server 308 through the External Interface 310 and the TCP/IP Protocol Stack 314. The Proxy Server 308 relays the response through the TCP/IP Protocol Stack 314 towards the client computer 302. The Redirection component of driver 306 places the Proxy Server address in the source IP address with '204.71.200.75' and sends it to the client computer 302. The client computer 302 receives the DNS response of 'www.cisco.com' equals to '198.133.219.75' apparently from '204.71.200.75'. The client computer 302 then attempts to open a TCP connection (SYN) to "198.133.219.75:80." The redirection component of driver 306 records '198.133.219.75' and sets the destination to 207.46.238.57 (Proxy Server address). The Proxy Server 308 accepts the connection and replies to open the reverse direction (ACK.SYN). The redirection component of driver 306 replaces the source address with '198.133.219.75' before it sends the packet to the client computer 302. The client computer 302 responds with ACK to complete establishing the session. As before, the redirection component of driver 306 rewrites the destination as 207.46.238.57 (Proxy Server address). The client computer 302 sends a "get for/ciscoproxy.pac" to 198.133.219.25 (www.cisco.com IP address). The redirection component of driver 306 records '198.133.219.25' and alters the destination IP address to 207.46.238.57 (Proxy Server address) and names the file to the Local .PAC Settings file (/ekgnkm/proxy.pac). Extra space may be padded with blanks. Extraneous headers are removed to make sure that there is enough space. The appropriate checksums are then adjusted. The Proxy Server 308 receives a request apparently for '/ekgnkm/proxy.pac' ultimately from the Client Computer 302. The client computer 302 replies with the contents of the Local .PAC Settings file. The redirection component of driver 306 sets the source IP to '198.133.219.25' on the response data and rewrites the destination IP to '207.46.238.57' on the acknowledgements from the client computer 302. Thus, the client computer 302 receives the Local .PAC Settings 316 but they appear to come from http://www.cisco.com/ciscoproxy.pac.

In the above steps, it is assumed that all transfers between the Proxy Server 308 and the redirection component of driver 306 go through the TCP/IP Protocol Stack 314 and all transfers between the client computer 302 and the redirection component of driver 306 go through the Internal Interface 304.

One alternative embodiment of apparatus 300 may be to place some or all of the components in apparatus 300 in a router instead of a server. It may also be possible to place the Proxy Server 308 and the local ".pac" settings 316 on a separate computer and move the remaining components into a router. In that configuration, the "unauthorized" client packets would go out through the External Interface 310, but the replacement destination IP address for these packets would be in the separate computer.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

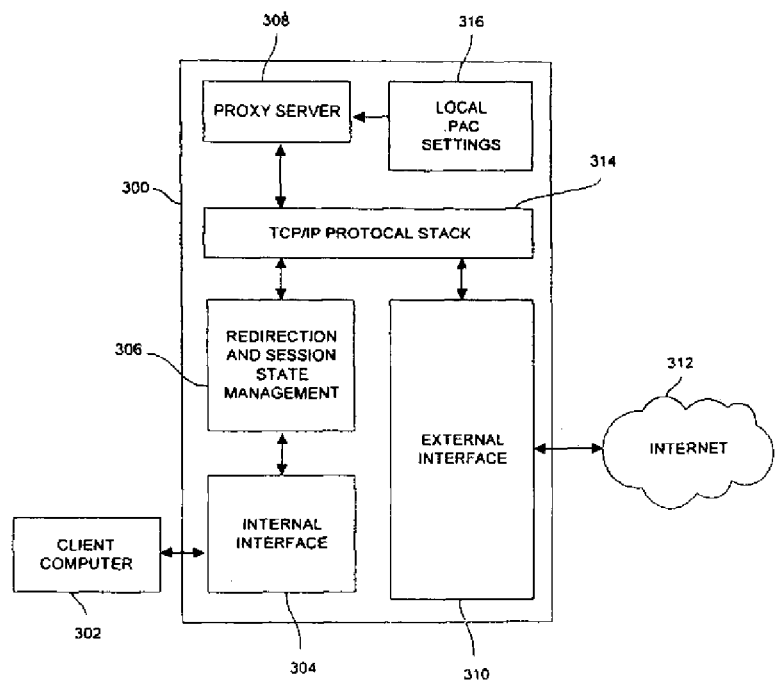

What is claimed is:

1. A method for emulating a request from a user device to a second device for a proxy auto configuration file, the user device configured to request the proxy auto configuration file from a first device, the method comprising:
    intercepting packets from the user device;
    identifying packets relating to a request for the proxy auto configuration file from the first device;
    causing a replacement proxy auto-configuration file to be available, said replacement proxy auto-configuration file locally accessible from said second device; and
    serving said replacement proxy auto-configuration file to the user device in response to said identifying.

2. The method according to claim 1, wherein said causing further comprises redirecting the request for the proxy auto-configuration file to request said replacement proxy auto-configuration file.

3. The method according to claim 1, wherein said causing further comprises rewriting the packets for the request for the proxy auto-configuration file to request said replacement proxy auto-configuration file.

4. An apparatus for emulating a request from a user device to a second device for a proxy auto-configuration file, the user device configured to request the proxy auto-configuration file from a first device, the apparatus comprising:
    means for intercepting packets from the user device;
    means for identifying packets relating to a request for the proxy auto configuration file from the first device;
    means for causing a replacement proxy auto-configuration file to be available, said replacement proxy auto-configuration file locally accessible from said second device; and
    means for serving said replacement proxy auto-configuration file to the user device in response to said identifying.

5. The apparatus according to claim 4, wherein said means for causing further comprises means for redirecting the request for the proxy auto-configuration file to request said replacement proxy auto-configuration file.

6. The apparatus according to claim 4, wherein said means for causing further comprises means for rewriting the packets for the request for the proxy auto-configuration file to request said replacement proxy auto-configuration file.

7. A program storage device readable by a machine, tangibly embodying a program of instructions readable by the machine to perform a method for emulating a request from a user device to a second device for a proxy auto configuration file, the user device configured to request the proxy auto configuration file from a first device, the method comprising:
    intercepting packets from the user device;
    identifying packets relating to a request for the proxy auto configuration file from the first device;
    causing a replacement proxy auto-configuration file to be available, said replacement proxy auto-configuration file locally accessible from said second device; and
    serving said replacement proxy auto-configuration file to the user device in response to said identifying.

8. The method according to claim 7, wherein said causing further comprises redirecting the request for the proxy auto-configuration file to request said replacement proxy auto-configuration file.

9. The method according to claim 7, wherein said causing further comprises rewriting the packets for the request for the proxy auto-configuration file to request said replacement proxy auto-configuration file.

10. An apparatus for emulating a request from a user device to a second device for a proxy auto-configuration file, the user device configured to request the proxy auto-configuration file from a first device, the apparatus comprising:
    an internal interface for intercepting packets from the user device;
    a driver for identifying packets relating to a request for the proxy auto configuration file from the first device;
    a server for causing a replacement proxy auto-configuration file to be available, said replacement proxy auto-configuration file locally available from said second device.

11. The apparatus according to claim 10, further comprising a TCP/IP protocol stack disposed between said driver and said server.

12. The apparatus according to claim 10, further comprising an external interface disposed between said TCP/IP protocol stack and at least one remote server.

* * * * *

UNITED STATES PATENT AND TRADEMARK OFFICE
CERTIFICATE OF CORRECTION

| | | |
|---|---|---|
| PATENT NO. | : 8,166,141 B1 | |
| APPLICATION NO. | : 09/906632 | |
| DATED | : April 24, 2012 | |
| INVENTOR(S) | : Van Horne, III | |

It is certified that error appears in the above-identified patent and that said Letters Patent is hereby corrected as shown below:

The Title page;

The Title page, showing the illustrative figure, should be deleted and substitute therefor the attached Title page.

Figure 1:
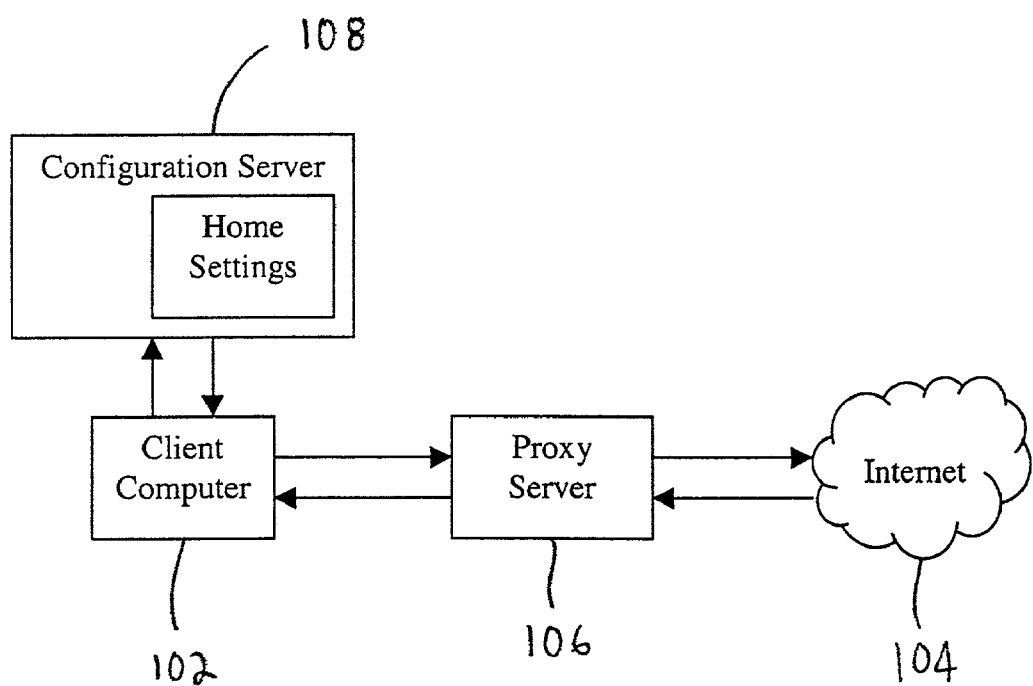
FIG. 1 is a schematic diagram illustrating a client computer accessing a web server through a proxy server in accordance with the prior art.

Delete figs. 1-3 and substitute therefor the drawing sheet, consisting of figs. 1-3 as shown on the attached page.

Signed and Sealed this
Eleventh Day of September, 2012

David J. Kappos
*Director of the United States Patent and Trademark Office*

(12) United States Patent
Van Horne, III

(10) Patent No.: US 8,166,141 B1
(45) Date of Patent: Apr. 24, 2012

(54) METHOD AND APPARATUS FOR EMULATING WEB BROWSER PROXIES

(75) Inventor: Edwin James Van Horne, III, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 2967 days.

(21) Appl. No.: 09/906,632

(22) Filed: Jul. 16, 2001

(51) Int. Cl.
*G06F 15/173* (2006.01)

(52) U.S. Cl. .................. 709/223; 709/218; 709/225

(58) Field of Classification Search .............. 709/225, 709/223, 218
See application file for complete search history.

(56) References Cited

U.S. PATENT DOCUMENTS

| | | | |
|---|---|---|---|
| 5,935,212 A | 8/1999 | Kalajan et al. | 709/228 |
| 5,991,810 A | 11/1999 | Shapiro et al. | 709/229 |
| 6,130,892 A | 10/2000 | Short et al. | 370/401 |
| 6,138,162 A | 10/2000 | Pistriotto et al. | 709/229 |
| 6,173,311 B1 * | 1/2001 | Hassett et al. | 709/202 |
| 6,182,141 B1 | 1/2001 | Blum et al. | 709/227 |
| 6,185,616 B1 | 2/2001 | Namma et al. | 709/227 |
| 6,212,560 B1 * | 4/2001 | Fairchild | 709/223 |
| 6,212,565 B1 | 4/2001 | Gupta | 709/229 |
| 6,442,601 B1 * | 8/2002 | Gampper et al. | 709/218 |
| 6,567,857 B1 * | 5/2003 | Gupta et al. | 709/238 |
| 6,728,885 B1 * | 4/2004 | Taylor et al. | 713/201 |
| 6,792,461 B1 * | 9/2004 | Hericourt | 709/225 |

* cited by examiner

*Primary Examiner* — Kyung H Shin
(74) *Attorney, Agent, or Firm* — BainwoodHuang

(57) ABSTRACT

A user device disposed on a local area network (LAN) requests a proxy auto-configuration file from a first proxy server. Where the first proxy server is not present on the LAN, a second proxy server on the LAN intercepts the request and responds to it by causing a replacement proxy auto-configuration file to be sent to the user device. The user device utilizes the replacement proxy auto-configuration file to configure itself to utilize the second proxy server on the LAN.

12 Claims, 3 Drawing Sheets